United States Patent
Peng

(10) Patent No.: US 9,501,435 B2
(45) Date of Patent: Nov. 22, 2016

(54) ENABLING METHOD AND ENABLING DEVICE FOR DEBUGGING PORT OF TERMINAL, AND TERMINAL

(71) Applicant: ZTE Corporation, Shenzhen, Guangdong (CN)

(72) Inventor: Ninghua Peng, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/891,424

(22) PCT Filed: Dec. 9, 2013

(86) PCT No.: PCT/CN2013/088897
§ 371 (c)(1),
(2) Date: Nov. 16, 2015

(87) PCT Pub. No.: WO2014/187106
PCT Pub. Date: Nov. 27, 2014

(65) Prior Publication Data
US 2016/0085699 A1    Mar. 24, 2016

(30) Foreign Application Priority Data

May 20, 2013    (CN) .......................... 2013 1 0188289

(51) Int. Cl.
*G06F 11/00*    (2006.01)
*G06F 13/24*    (2006.01)
(Continued)

(52) U.S. Cl.
CPC ............... *G06F 13/24* (2013.01); *G06F 3/002* (2013.01); *G06F 11/3024* (2013.01);
(Continued)

(58) Field of Classification Search
CPC .... G06F 13/24; G06F 3/002; G06F 11/3024; G06F 11/3055; G06F 11/3664; G06F 11/3656; G06F 11/3648; H04M 1/72522; H04M 1/72527; H04M 1/7258
See application file for complete search history.

(56) References Cited

U.S. PATENT DOCUMENTS

| 8,276,199 | B2 | 9/2012 | Xu |
| 8,954,800 | B1 * | 2/2015 | Spangler ............. G06F 11/1438 714/23 |

(Continued)

FOREIGN PATENT DOCUMENTS

| CN | 102446083 A | 5/2012 |
| CN | 102999335 A | 3/2013 |
| CN | 103002155 A | 3/2013 |

OTHER PUBLICATIONS

International Search Report in international application No. PCT/CN2013/088897, mailed on Jan. 23, 2014.
(Continued)

*Primary Examiner* — Philip Guyton
(74) *Attorney, Agent, or Firm* — Oppedahl Patent Law Firm LLC

(57) ABSTRACT

An enabling method and enabling device for a debugging port of a terminal, and a terminal are described, which are configured to enable a debugging port of a terminal under the condition of failure of a touch screen. The method includes: an instruction of enabling a debugging port input by a user is acquired, wherein the instruction is generated by simultaneously executing first operation of pressing a key of a terminal and second operation of covering an infrared sensor of the terminal; an interrupt service subprogram of the infrared sensor is triggered according to the instruction; a state of the infrared sensor and a pressed state of the key of the terminal are judged according to the interrupt service subprogram, and judgement results are obtained; and when the judgement results are determined to be consistent with preset standards, a screen of the terminal is controlled to be unlocked, and the debugging port is enabled. By adopting the technical solutions of the embodiment of the disclosure, an Android Debug Bridge (ADB) debugging port of a mobile phone Universal Serial Bus (USB) may be reliably enabled under the condition of failure of the touch screen to import personal information in a mobile phone into a computer by mobile phone management software in the computer through a USB cable.

9 Claims, 4 Drawing Sheets

(51) Int. Cl.
*G06F 11/36* (2006.01)
*G06F 3/00* (2006.01)
*G06F 11/30* (2006.01)
*H04M 1/725* (2006.01)
*H04M 1/67* (2006.01)

(52) U.S. Cl.
CPC ...... *G06F 11/3055* (2013.01); *G06F 11/3664* (2013.01); *H04M 1/67* (2013.01); *H04M 1/72522* (2013.01); *H04M 1/72527* (2013.01); *H04M 2250/12* (2013.01); *H04M 2250/64* (2013.01)

(56) References Cited

U.S. PATENT DOCUMENTS

| | | | | |
|---|---|---|---|---|
| 2002/0162052 A1* | 10/2002 | Lewis | ............ | G06F 9/4406 714/36 |
| 2004/0172578 A1* | 9/2004 | Chen | ............ | G06F 11/1417 714/15 |
| 2006/0015711 A1* | 1/2006 | Bang | ............ | G06F 11/1417 713/2 |
| 2010/0263043 A1 | 10/2010 | Xu | | |
| 2014/0308994 A1* | 10/2014 | Zeng | ............ | H03K 17/22 455/572 |
| 2015/0199028 A1* | 7/2015 | Spangler | ............ | G06F 9/441 713/2 |
| 2015/0379304 A1* | 12/2015 | Chan | ............ | G06F 17/30091 713/193 |

OTHER PUBLICATIONS

English Translation of the Written Opinion of the International Search Authority in international application No. PCT/CN2013/088897, mailed on Jan. 23, 2014.

Anonymous: "Broken screen while debug mode was disabled. How can Ire-enable adb?—Android Enthusiasts Stack Exchange",,May 2, 2013 (May 2, 2013), XP055270570, Retrieved from the Internet: URL:http://web.archive.org/web/20130502092637/http://android.stackexchange.com/questions/12834/broken-screen-while-debug-mode-was-disabled-how-can-i-re-enable-adb[retrieved on May 4, 2016].

Supplementary European Search Report in European application No. 13885247.0, mailed on May 23, 2016.

* cited by examiner

ENABLING METHOD AND ENABLING DEVICE FOR DEBUGGING PORT OF TERMINAL, AND TERMINAL

TECHNICAL FIELD

The disclosure relates to the field of smart mobile phones, and in particular to an enabling method and enabling device for a debugging port of a terminal, and a terminal.

BACKGROUND

At present, a touch screen is the most frequently used part of a smart mobile phone, a capacitive touch screen is the mainstream, and the screen is required to be touched by a finger or a capacitive stylus. A capacitive touch screen is made from a more fragile material, and easily fails locally after being touched for a long time. Drift of a touch screen is easily formed under influence of temperature and a magnetic field, which may cause inaccurate touch. A touch screen usually fails permanently due to damp, static electricity, squeezing and falling.

For a normal Android mobile phone, a user may finish exporting a contact list, short messages and application programs of the user and even backing up a system by enabling an Android Debug Bridge (ADB) debugging port and installing application software such as Pea Pod in a Personal Computer (PC) through a Universal Serial Bus (USB) cable. If corresponding software is installed in a mobile phone end and a PC, a smart mobile phone may also be operated by the PC through a USB cable. After a touch screen fails, a user usually expects to export a contact list and the like in an old mobile phone and then import them into a new mobile phone in case of mobile phone replacement. However, it is difficult to export data in the old mobile phone if an ADB debugging port is not enabled in advance.

Therefore, there exists the problem of loss of personal information of a user caused by incapability of reliably enabling an ADB debugging port under the condition of failure of a touch screen in an existing technology.

SUMMARY

In view of this, the embodiment of the disclosure provides an enabling method and enabling device for a debugging port of a terminal, and a terminal.

To this end, according to one aspect of an embodiment of the disclosure, an enabling method for a debugging port of a terminal is provided, and the following technical solution is adopted.

The enabling method for a debugging port of a terminal includes: acquiring an instruction of enabling a debugging port input by a user, wherein the instruction is generated by executing second operation of covering an infrared sensor of a terminal at same time of executing first operation of pressing a key of the terminal;

triggering an interrupt service subprogram of the infrared sensor according to the instruction;

judging a state of the infrared sensor and a pressed state of the key of the terminal according to the interrupt service subprogram, and obtaining judgement results; and when the judgement results are determined to be consistent with preset standards, controlling a screen of the terminal to be unlocked, and enabling the debugging port.

Preferably, the instruction may be generated by executing the second operation of covering the infrared sensor of the terminal at the same time of executing first operation of pressing volume up and volume down keys of the terminal.

Preferably, the determining that the judgment results are consistent with the preset standards by the interrupt service subprogram may include:

acquiring, by the interrupt service subprogram, the state of the infrared sensor and the pressed state of the key of the terminal;

judging whether the state of the infrared sensor is a proximity event or not and whether the pressed state of the key is effective or not to obtain the judgment results; and determining that the judgment results are consistent with the preset standards when the judgment results indicate that the state of the infrared sensor is the proximity event and the pressed state of the key is effective.

Preferably, the state of the infrared sensor may refer to: the proximity event of the infrared sensor.

Preferably, the condition that the pressed state of the key is effective may refer to that: the key is pressed and time for which the key is pressed reaches a preset time value.

According to another aspect of an embodiment of the disclosure, an enabling device for a debugging port of a terminal is provided, and the following technical solution is adopted.

The enabling device for a debugging port of a terminal includes: an acquisition module, configured to acquire an instruction of enabling a debugging port input by a user, wherein the instruction is generated by executing second operation of covering an infrared sensor of a terminal at same time of executing first operation of pressing a key of the terminal;

a triggering module, configured to trigger an interrupt service subprogram of the infrared sensor according to the instruction;

a judgment module, configured to judge a state of the infrared sensor and a pressed state of the key of the terminal according to the interrupt service subprogram, and obtain judgement results; and a control module, configured, when the judgement results are determined to be consistent with preset standards, to control a screen of the terminal to be unlocked and enable the debugging port.

Preferably, the judgment module may include:

an acquisition sub-module, configured to acquire the state of the infrared sensor and the pressed state of the key of the terminal by virtue of the interrupt service subprogram;

a judgment sub-module, configured to judge whether the state of the infrared sensor is a proximity event or not and whether the pressed state of the key is effective or not to obtain the judgment results; and a determination module, configured to determine that the judgment results are consistent with the preset standards when the judgment results indicate that the state of the infrared sensor is the proximity event and the pressed state of the key is effective.

According to a third aspect of an embodiment of the disclosure, a terminal is provided, and the following technical solution is adopted.

The terminal includes the abovementioned enabling device.

According to the technical solutions provided by embodiments of the disclosure, an ADB debugging port of a mobile phone USB may be reliably enabled by virtue of the infrared sensor and the key under the condition of failure of a touch screen of a mobile phone to import personal information in the mobile phone into a computer by mobile phone management software in the computer through a USB cable, thereby improving quality of the mobile phone and user experiences.

BRIEF DESCRIPTION OF THE DRAWINGS

The drawings are adopted to provide further understanding of the disclosure, and form a part of the disclosure. Schematic embodiments of the disclosure and description thereof are adopted to explain the disclosure and not intended to form improper limits to the disclosure. In the drawings.

DETAILED DESCRIPTION

Embodiments of the disclosure are described below with reference to the drawings in detail, but the disclosure may be implemented in various manners limited and covered by Claims.

Embodiment 1

Figure 1:
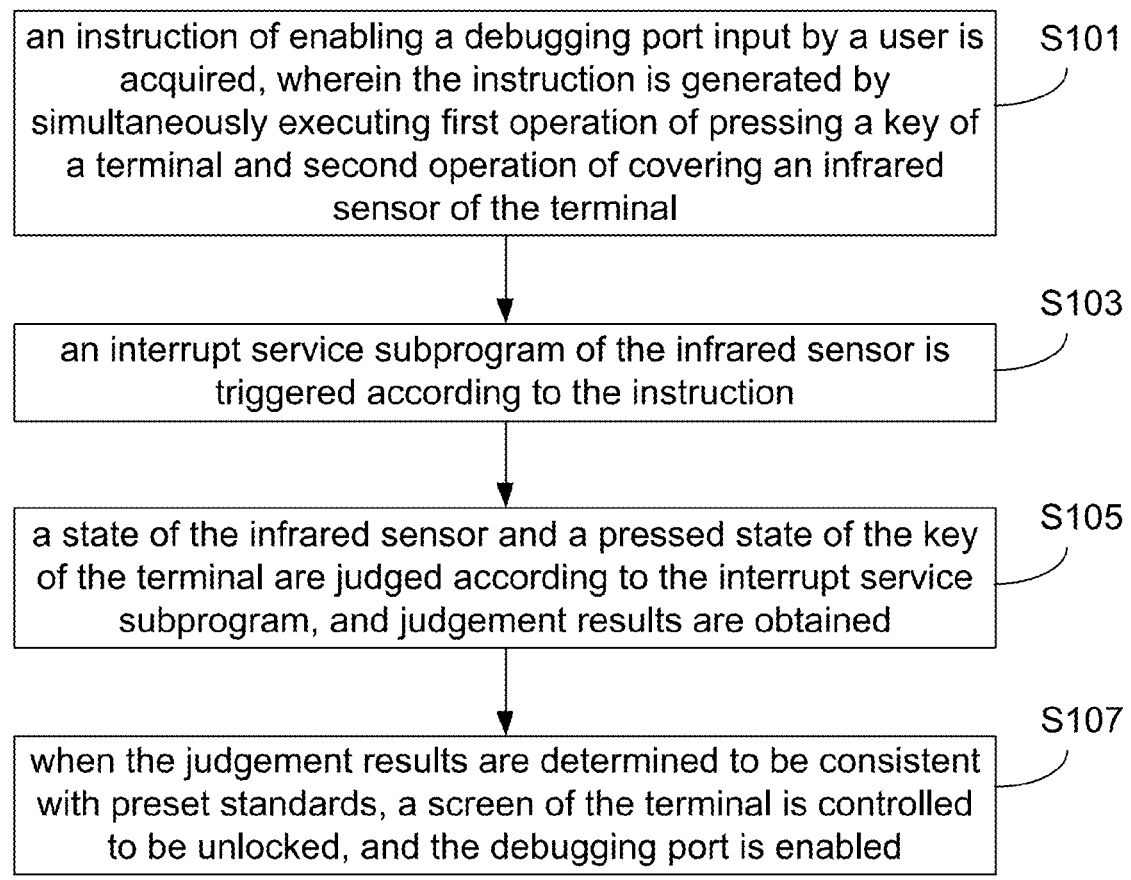
FIG. 1 is a flowchart of an enabling method for a debugging port of a terminal according to embodiment 1 of the disclosure.

FIG. 1 is a flowchart of an enabling method for a debugging port of a terminal according to embodiment 1 of the disclosure.

As shown in FIG. 1, the enabling method for a debugging port of a terminal includes:

Step 101: an instruction of enabling a debugging port input by a user is acquired, wherein the instruction is generated by simultaneously executing first operation of pressing a key of a terminal and second operation of covering an infrared sensor of the terminal;

Step 103: an interrupt service subprogram of the infrared sensor is triggered according to the instruction;

Step 105: a state of the infrared sensor and a pressed state of the key of the terminal are judged according to the interrupt service subprogram, and judgement results are obtained; and Step 107: when the judgement results are determined to be consistent with preset standards, a screen of the terminal is controlled to be unlocked, and the debugging port is enabled.

In the embodiment, the instruction of enabling the debugging port input by the user is acquired in step 101, and the instruction may be generated by simultaneously executing the first and second operation, that is: the instruction is generated by simultaneously executing the first operation of pressing the key of the terminal and the second operation of covering the infrared sensor of the terminal; the key may be volume up and volume down keys, and may also be another key on the terminal; and the covering the infrared sensor refers to: covering an infrared proximity sensor with a finger at the same time of pressing the key, that is: the infrared sensor may be the infrared proximity sensor.

The interrupt service subprogram of the infrared sensor is triggered according to the generated instruction in step 103, and the interrupt service subprogram is configured to judge the state of covering the infrared proximity sensor with the finger of the user and the pressed state of the key.

In step 105, the state of the infrared sensor and the pressed state of the key of the terminal are judged according to the interrupt service subprogram, and the judgment results are obtained.

In step 107, when the judgment results are consistent with the preset standards, the screen of the terminal is controlled to be unlocked, and the debugging port is enabled.

The preset standards refer to: a preset covered state standard of the infrared sensor and a preset pressed state standard of the key. When the covered state of the infrared sensor reaches the preset state standard, a proximity event is determined, and the pressed state standard of the key may be a preset time length. When the above operations can be determined to be effective, the screen is unlocked and a setting interface of an ADB debugging port pops up to enable the ADB debugging port in step 107, and then the user may export data in a mobile phone into a computer through a USB cable and further import the data into a new mobile phone to fulfill the final aim.

When state information of the infrared sensor is read to be a non-proximity event, or volume up and volume down keys are not pressed at the same time of covering the infrared proximity sensor with the finger of the user, or a time length for which volume up and volume down keys are pressed does not reach a preset value, the interrupt service subprogram may determine an abnormality and select to directly quit without realizing any other function, the screen cannot be unlocked and the setting interface of the ADB debugging port can also not pop up.

By adopting the technical solution of the embodiment, an ADB debugging port of a mobile phone USB may be effectively enabled by virtue of the infrared sensor and the key under the condition of failure of a capacitive touch screen to import personal information in the mobile phone into the computer by mobile phone management software in the computer through a USB cable.

Specifically, an enabling method for a debugging port of a terminal may be described with embodiment 2.

Embodiment 2

Figure 2:
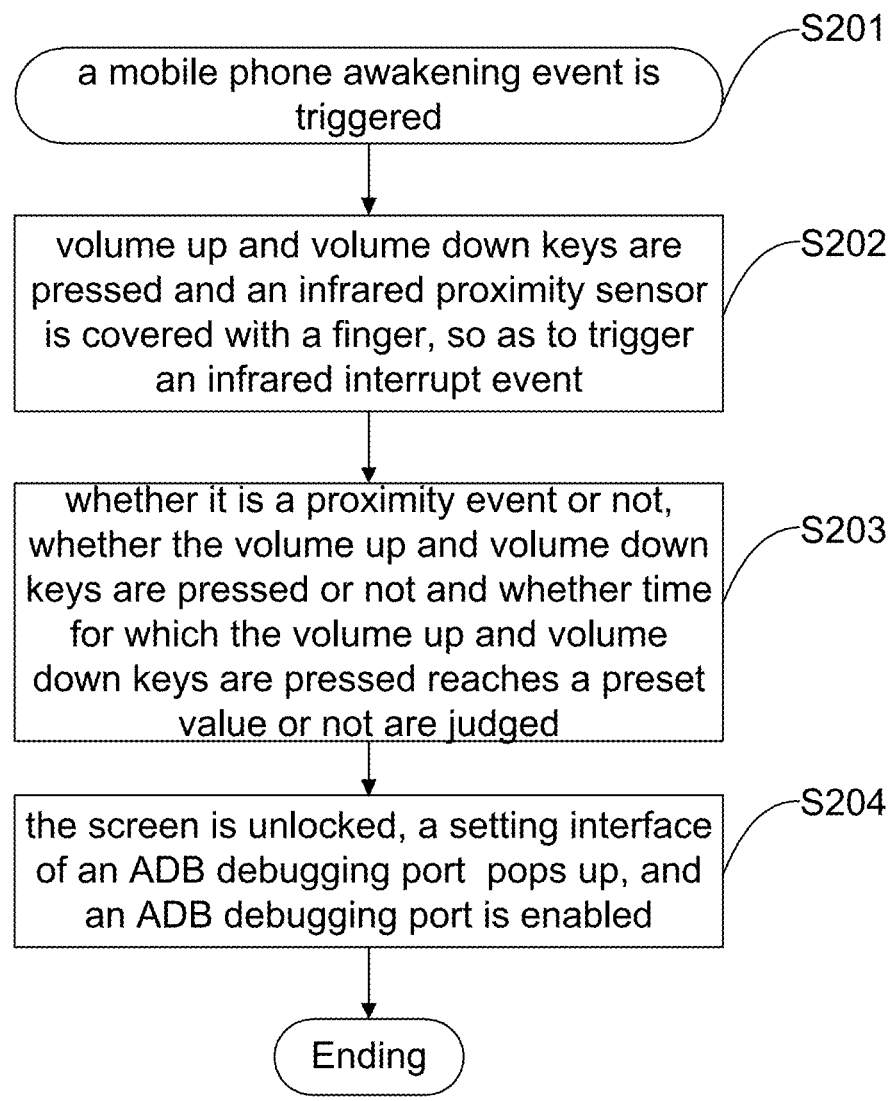
FIG. 2 is a flowchart of an enabling method for a debugging port of a terminal according to embodiment 2 of the disclosure.

FIG. 2 is a flowchart of an enabling method for a debugging port of a terminal according to embodiment 2 of the disclosure.

As shown in FIG. 2, the enabling method for a debugging port of a terminal includes:

Step 201: a mobile phone (in a screen-locked state) awakening event is triggered.

In the step, under the condition of failure of a capacitive touch screen, a mobile phone is in the screen-locked state, and an ADB debugging port enabling requirement made by a user is acquired.

Step 202: volume up and volume down keys are pressed and an infrared proximity sensor is covered with a finger, so as to trigger an infrared interrupt event.

In the step, the user is required to cover the infrared proximity sensor with the finger and simultaneously press the volume up and volume down keys to trigger an interrupt service subprogram of the infrared proximity sensor.

Step 203: whether it is a proximity event or not, whether the volume up and volume down keys are pressed or not, and whether time for which the volume up and volume down keys are pressed reaches a preset value or not are judged.

In the step, the subprogram reads state information of the sensor, and judges whether the state information indicates a proximity event or not. If the state information does not indicate a proximity event, the subprogram quits, and does not execute any other operation; and if the state information indicates a proximity event, the subprogram further judges whether the volume up and volume down keys are effectively pressed or not. If the volume up and volume down keys are not effectively pressed, the subprogram quits, and does not execute any other operation; and if the volume up and volume down keys are effectively pressed, the subprogram further judges whether a time length for which the volume up and volume down keys are pressed reaches the preset value or not. If the time length does not reach the preset value, the subprogram quits, and does not execute any other operation, and if the time length reaches the preset value, the subprogram finishes executing judgment operation, and enters a screen unlocking step.

Step 204: the screen is unlocked, a setting interface of an ADB debugging port pops up, and an ADB debugging port is enabled.

In the step, the screen is successfully unlocked, the setting interface of the ADB debugging port pops up, and the ADB debugging port is enabled. Then, the user may connect the mobile phone to a computer through a USB cable, and the computer starts management software to finish importing personal information.

By adopting the technical method of the embodiment of the disclosure, the ADB debugging port may be reliably enabled, and data in the mobile phone of the user may be successfully exported, so that loss of the user is reduced.

Preferably, the method for enabling the ADB debugging port of a mobile phone USB by virtue of the infrared sensor, the volume up and volume down keys may be described with embodiment 3.

Embodiment 3

Figure 3:
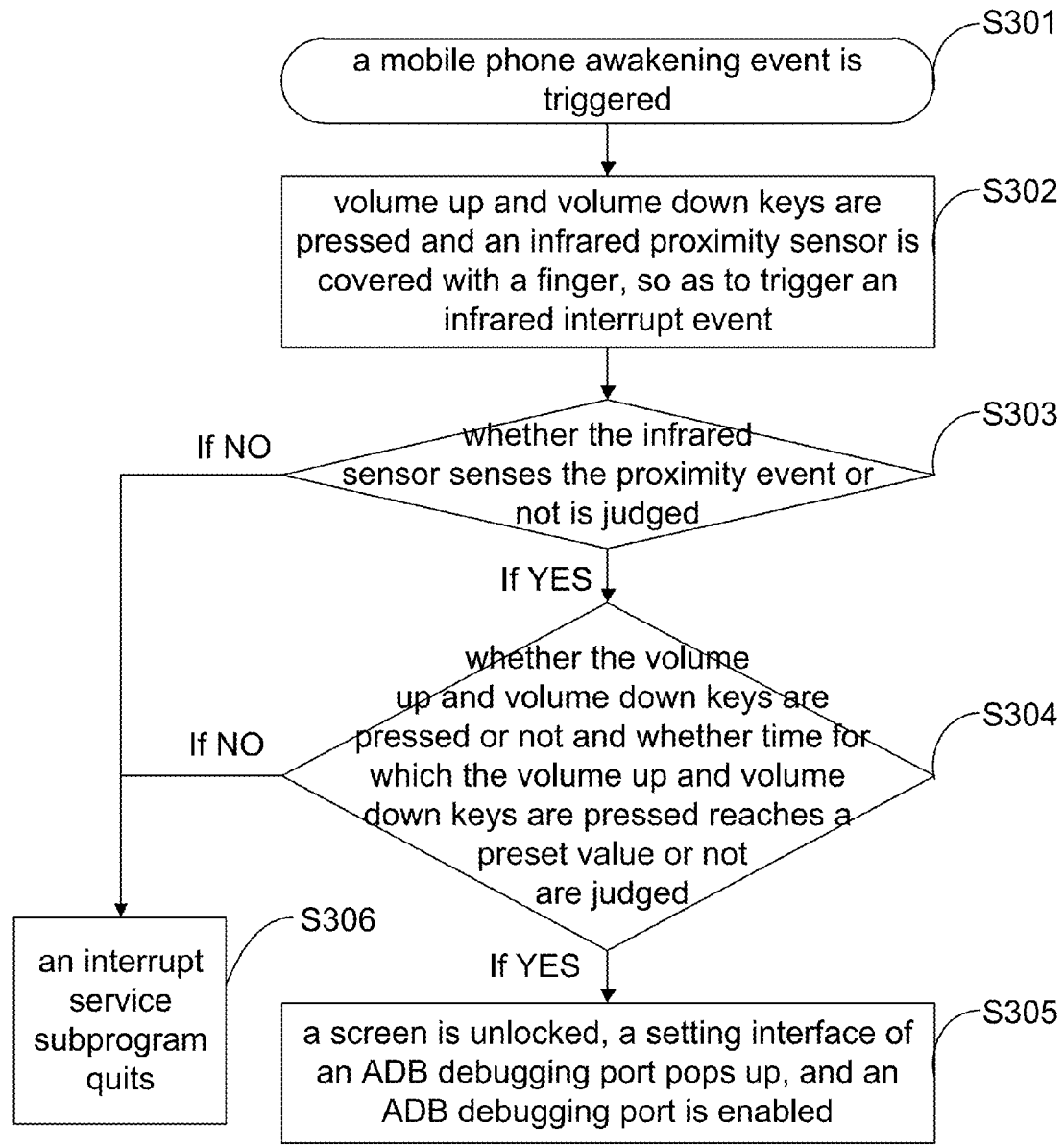
FIG. 3 is a flowchart of an enabling method for a debugging port of a terminal according to embodiment 3 of the disclosure.

FIG. 3 is a flowchart of an enabling method for a debugging port of a terminal according to embodiment 3 of the disclosure.

As shown in FIG. 3, the enabling method for a debugging port of a terminal includes:

Step 301: a mobile phone awakening event is triggered.

In the step, the mobile phone awakening event is triggered to make a mobile phone enter a screen-locked state.

Step 302: volume up and volume down keys are pressed and an infrared proximity sensor is covered with a finger, so as to trigger an infrared interrupt event.

In the step, the volume up and volume down keys are pressed, the infrared proximity sensor is covered with the finger at the same time, and the infrared proximity sensor is triggered to send an interrupt signal to a processor to form an interrupt notification event when sensing a proximity event.

Step 303: whether the infrared sensor senses the proximity event or not is judged.

In the step, the processor executes an interrupt service subprogram corresponding to the interrupt signal in response to the interrupt signal, acquires state information of the infrared sensor through a controller bus of the infrared sensor, such as an Inter-Integrated Circuit (I2C) bus, and judges whether the state information indicates the proximity event or not; if yes, step 304 is executed; otherwise step 306 is executed.

Step 304: whether the volume up and volume down keys are pressed or not and whether time for which the volume up and volume down keys are pressed reaches a preset value or not are judged.

In the step, a monitoring timer in the interrupt service subprogram of the infrared sensor is started, and a time zone is set. In the time zone, whether the volume up and volume down keys are simultaneously pressed or not and whether the time for which the volume up and volume down keys are pressed reaches a value of the set time zone or not are detected; if the time reaches the value of the time zone, it is indicated that the volume up and volume down keys are effectively pressed, and step 305 is executed; otherwise, step 306 is executed.

Step 305: a screen is unlocked, a setting interface of an ADB debugging port pops up, and an ADB debugging port is enabled.

Step 306: the interrupt service subprogram quits.

In the step, the interrupt service subprogram directly quits without any processing.

The embodiment provides the method for enabling the ADB debugging port of a mobile phone USB by virtue of the infrared sensor, the volume up and volume down keys, and from the above, it is clear that the ADB debugging port may be reliably enabled to import personal information of a user into a PC under the condition of failure of the touch screen of the mobile phone only by adding a code for realizing such a function to software of the mobile phone through an existing hardware resource, thereby improving quality of the mobile phone, reducing loss of the user and improving user experiences.

Embodiment 4

Figure 4:
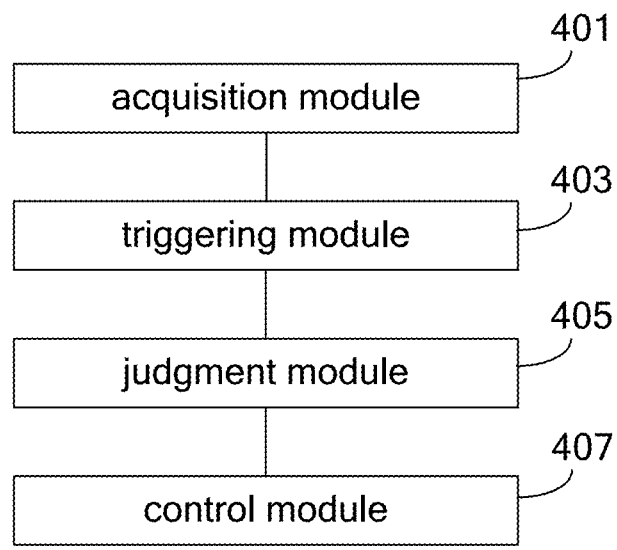
FIG. 4 is a structure diagram of an enabling device for a debugging port of a terminal according to embodiment 4 of the disclosure.

FIG. 4 is an enabling device for a debugging port of a terminal according to embodiment 4 of the disclosure.

As shown in FIG. 4, the enabling device for a debugging port of a terminal includes:

an acquisition module 401, configured to acquire an instruction of enabling a debugging port input by a user, wherein the instruction is generated by simultaneously executing first operation of pressing a key of a terminal and second operation of covering an infrared sensor of the terminal;

a triggering module 403, configured to trigger an interrupt service subprogram of the infrared sensor according to the instruction;

a judgment module 405, configured to judge a state of the infrared sensor and a pressed state of the key of the terminal according to the interrupt service subprogram, and obtain judgement results; and a control module 407, configured, when the judgement results are determined to be consistent with preset standards, to control a screen of the terminal to be unlocked and enable the debugging port.

Here, each of the acquisition module, the triggering module, the judgment module and the control module may be implemented by a Central Processing Unit (CPU), Digital Signal Processor (DSP) or Field-Programmable Gate Array (FPGA) in the terminal.

Figure 5:
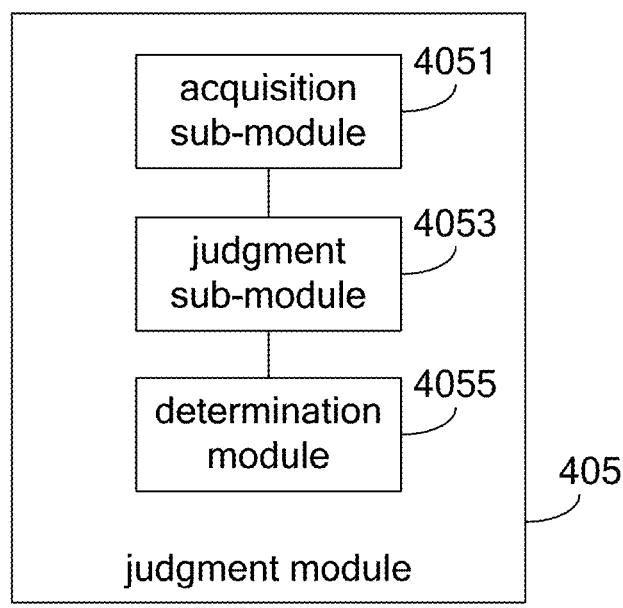
FIG. 5 is a structure diagram of a judgment module according to embodiment 4 of the disclosure.

Preferably, as shown in FIG. 5, the judgment module 405 includes:

an acquisition sub-module 4051, configured to acquire the state of the infrared sensor and the pressed state of the key of the terminal by virtue of the interrupt service subprogram; the interrupt service subprogram acquires the state of the infrared sensor and the pressed state of the key of the terminal;

a judgment sub-module 4053, configured to judge whether the state of the infrared sensor is a proximity event or not and whether the pressed state of the key is effective or not to obtain the judgment results; and a determination module 4055, configured to determine that the judgment results are consistent with the preset standards when the judgment results indicate that the state of the infrared sensor is a proximity event and the pressed state of the key is effective.

Here, each of the acquisition sub-module, the judgment sub-module and the determination module may be implemented by the CPU, DSP or FPGA in the terminal.

The embodiment of the disclosure provides a terminal, which includes the abovementioned enabling device.

Compared with the existing technology, the technical solutions of the embodiment of the disclosure have the advantage that the ADB debugging port of the mobile phone USB may be enabled by virtue of the infrared sensor, the volume up key, the volume down key and the existing hardware resource under the condition of failure of the touch screen of the mobile phone to export the data in the mobile phone of the user to reduce the loss of the user. Therefore, the quality of the mobile phone and user experiences are improved.

Those skilled in the art should understand that the embodiment of the disclosure may provide a method, a system or a computer program product. Therefore, the disclosure may adopt a form of hardware embodiment, software embodiment or combined software and hardware embodiment. Moreover, the disclosure may adopt a form of computer program product executable on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one or more flows in the flowcharts and/or one or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

INDUSTRIAL APPLICABILITY

According to the embodiment of the disclosure, an instruction of enabling a debugging port input by a user is acquired, and an interrupt service subprogram of an infrared sensor is triggered according to the instruction; a state of the infrared sensor and a pressed state of a key of a terminal are judged according to the interrupt service subprogram, and judgment results are obtained; and when the judgment results are determined to be consistent with preset standards, a screen of the terminal is controlled to be unlocked, and the debugging port is enabled. Therefore, an ADB debugging port of a mobile phone USB may be effectively enabled by virtue of the infrared sensor, volume up and volume down keys under the condition of failure of a touch screen to import personal information in a mobile phone into a computer by mobile phone management software in the computer through a USB cable.

What is claimed is:

1. An enabling method for a debugging port of a terminal, comprising:
    acquiring an instruction of enabling a debugging port input by a user, wherein the instruction is generated by executing second operation of covering an infrared sensor of a terminal at same time of executing first operation of pressing a key of the terminal;
    triggering an interrupt service subprogram of the infrared sensor according to the instruction;
    judging a state of the infrared sensor and a pressed state of the key of the terminal according to the interrupt service subprogram, and obtaining judgement results; and
    when the judgement results are determined to be consistent with preset standards, controlling a screen of the terminal to be unlocked, and enabling the debugging port.

2. The enabling method according to claim 1, wherein the instruction is generated by executing the second operation of covering the infrared sensor of the terminal at the same time of executing first operation of pressing volume up and volume down keys of the terminal.

3. The enabling method according to claim 1, wherein determining that the judgment results are consistent with the preset standards by the interrupt service subprogram comprises:
    acquiring, by the interrupt service subprogram, the state of the infrared sensor and the pressed state of the key of the terminal;
    judging whether the state of the infrared sensor is a proximity event or not and whether the pressed state of the key is effective or not to obtain the judgment results; and
    determining that the judgment results are consistent with the preset standards when the judgment results indicate that the state of the infrared sensor is the proximity event and the pressed state of the key is effective.

4. The enabling method according to claim 3, wherein the state of the infrared sensor refers to: the proximity event of the infrared sensor.

5. The enabling method according to claim 3, wherein the condition that the pressed state of the key is effective refers to that: the key is pressed and time for which the key is pressed reaches a preset time value.

6. An enabling device for a debugging port of a terminal, comprising:
- a memory storing programming instructions; and
- a processor configured to be capable of executing the stored programming instructions to:
- acquire an instruction of enabling a debugging port input by a user, wherein the instruction is generated by executing second operation of covering an infrared sensor of a terminal at same time of executing first operation of pressing a key of the terminal;
- trigger an interrupt service subprogram of the infrared sensor according to the instruction;
- judge a state of the infrared sensor and a pressed state of the key of the terminal according to the interrupt service subprogram, and obtain judgement results; and
- control a screen of the terminal to be unlocked and enable the debugging port when the judgement results are determined to be consistent with preset standards.

7. The enabling device according to claim 6, wherein the processor is further configured to be capable of executing the stored programming instructions to:
- acquire the state of the infrared sensor and the pressed state of the key of the terminal by virtue of the interrupt service subprogram;
- judge whether the state of the infrared sensor is a proximity event or not and whether the pressed state of the key is effective or not to obtain the judgment results; and
- determine that the judgment results are consistent with the preset standards when the judgment results indicate that the state of the infrared sensor is the proximity event and the pressed state of the key is effective.

8. A terminal, comprising an enabling device, wherein the enabling device comprises:
- a memory storing programming instructions; and
- a processor configured to be capable of executing the stored programming instructions to:
- acquire an instruction of enabling a debugging port input by a user, wherein the instruction is generated by executing second operation of covering an infrared sensor of a terminal at same time of executing first operation of pressing a key of the terminal;
- trigger an interrupt service subprogram of the infrared sensor according to the instruction;
- judge a state of the infrared sensor and a pressed state of the key of the terminal according to the interrupt service subprogram, and obtain judgement results; and
- control a screen of the terminal to be unlocked and enable the debugging port when the judgement results are determined to be consistent with preset standards.

9. The terminal according to claim 8, wherein the processor is further configured to be capable of executing the stored programming instructions to:
- acquire the state of the infrared sensor and the pressed state of the key of the terminal by virtue of the interrupt service subprogram;
- judge whether the state of the infrared sensor is a proximity event or not and whether the pressed state of the key is effective or not to obtain the judgment results; and
- determine that the judgment results are consistent with the preset standards when the judgment results indicate that the state of the infrared sensor is the proximity event and the pressed state of the key is effective.

* * * * *